United States Patent [19]
Johnson et al.

[11] 4,068,966
[45] Jan. 17, 1978

[54] MOUNTING APPARATUS

[75] Inventors: Ben C. Johnson, New Braunfels, Tex.; Pieter Band, Blackburn, Australia

[73] Assignee: Thermon Manufacturing Company

[21] Appl. No.: 691,244

[22] Filed: June 1, 1976

Related U.S. Application Data

[63] Continuation of Ser. No. 562,024, March 26, 1975, abandoned.

[51] Int. Cl.² .............................................. F16L 3/08
[52] U.S. Cl. .................................. 403/397; 248/74 A
[58] Field of Search ...................... 248/74 R, 74 A, 68, 248/226 E, 316 D, 229, 230, 231, 540, 539, 541; 24/73 R, 73 CC, 81 R, 81 CC; 403/397, 396, 218; 219/535, 536, 301; 138/33, 111, 112; 165/172, 180, 181, 185

[56] References Cited

U.S. PATENT DOCUMENTS

| | | | |
|---|---|---|---|
| 1,423,742 | 7/1922 | Silverman | 219/535 |
| 1,478,896 | 12/1923 | Ferency | 24/81 CC |
| 1,816,301 | 7/1931 | Sundell | 248/74 A |
| 2,061,463 | 11/1936 | Hall | 248/73 |
| 2,303,108 | 11/1942 | Blackburn | 248/73 |
| 2,803,050 | 8/1957 | Fernberg | 24/259 RC |
| 2,961,479 | 11/1960 | Bertling | 248/74 A |
| 3,331,946 | 7/1967 | Bilbro et al. | 165/180 X |
| 3,834,458 | 9/1974 | Bilbro et al. | 165/180 X |
| 3,949,189 | 4/1976 | Bilbro et al. | 219/301 |
| 3,975,617 | 8/1976 | Othmer | 138/33 X |

Primary Examiner—Roy D. Frazier
Assistant Examiner—Terrell P. Lewis
Attorney, Agent, or Firm—Pravel, Wilson & Gambrell

[57] ABSTRACT

A mounting apparatus for releasably securing an external member to a tubular member having a resilient, curved clamp member with open ends. The curved clamp member extends for more than 180° but less than 360°, having a diameter less than the diameter of the tubular member prior to mounting the curved clamp member to the tubular member. The curved clamp member further includes a mounting portion opposite the open ends for engaging an external member for holding the same securely to the tubular member.

6 Claims, 2 Drawing Figures

MOUNTING APPARATUS

This is a continuation of application Ser. No. 562,024, filed Mar. 26, 1975 now abandoned.

BACKGROUND OF THE INVENTION

The field of this invention is clamping devices, particularly of these used to secure an external member to a tubular member.

U.S. Pat. No. 3,331,946 discloses the use of metal straps or bands having a "crimp-type" locking element wherein the strap or band encircles a tubular member having an external member thereon for securing the external member to the tubular member. This method for securing external members to tubular members is well known and commonly used as evidenced by U.S. Pat. No. 3,834,458 wherein similar clamping members were used for securing an assembly to a tubular member. However, these clamping bands require permanent installatin on the tubular member-external member combination. Removal of the same necessitates cutting of the strapping bands, hence resulting in a band not capable of reuse. Thus, these prior art references disclose non-releasable, non-reusable clamping straps that must be installed with special crimping tools which may not be removed without destroying the clamp and/or strapping material.

SUMMARY OF THE INVENTION

The present invention relates to a new and improved mounting apparatus for releaseably securing an exernal member to a tubular member. The mounting apparatus includes a resilient, curved clamp member having open ends. The clamp member extends for more than 130° but less than 360°, having a diameter, prior to mounting, less than that of the tubular member for resiliently engaging the tubular member. The curved clamp member furthermore includes a mounting portion opposite the open ends for engagement with the external member for holding the external member securely to the tubular member.

DESCRIPTION OF THE PREFERRED EMBODIMENT

Figure 1:
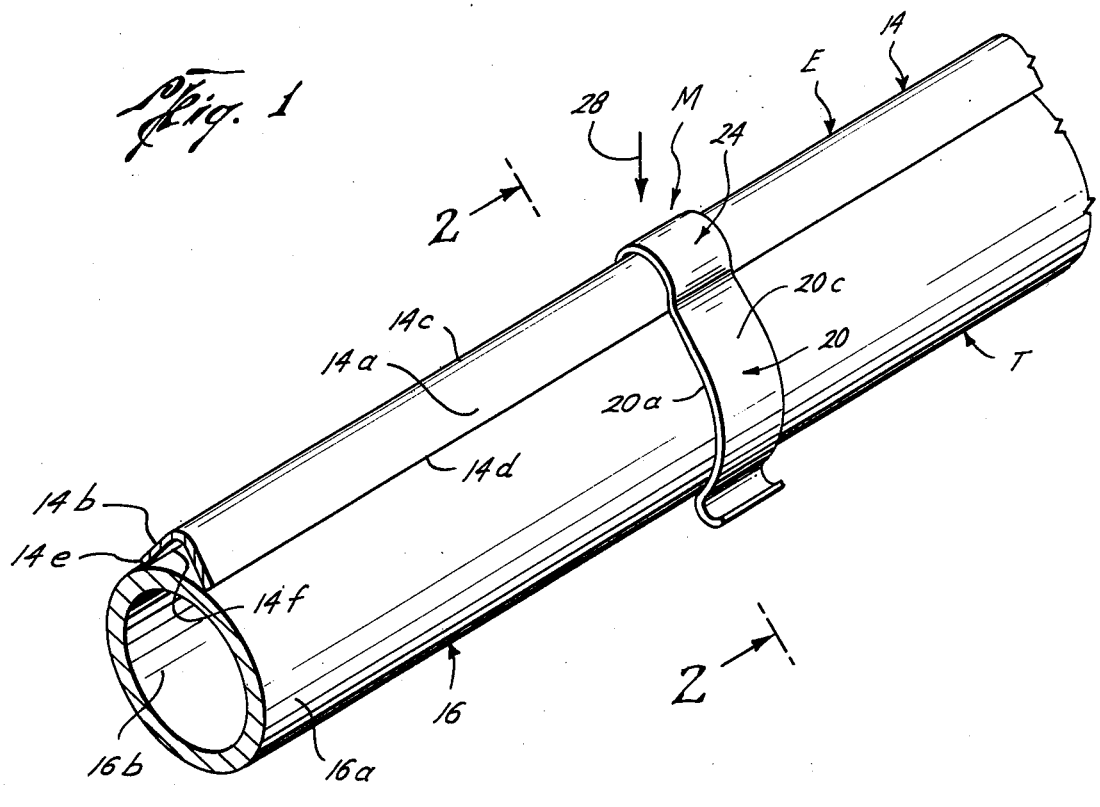
FIG. 1 is an isometric view of the mounting apparatus of the preferred embodiment of this invention.

Referring to the drawings, the letter M designates the mounting apparatus of the preferred embodiment of this invention. The mounting apparatus M is adapted for releaseably securing an external member E to a tubular member T.

Figure 2:
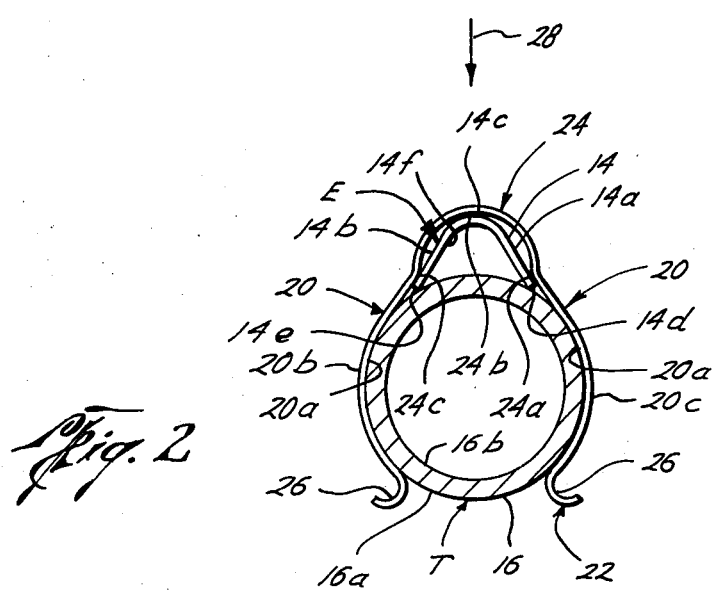
FIG. 2 is a sectional end view along the lines 2—2 of FIG. 1 of the mounting apparatus of the present invention.

The external member E may be of any desired configuration, this is circular, rectangular, or of any other geometric configuration. As shown in FIGS. 1 and 2, the external member E is of the nature of a channel 14 having side portions 14a, 14b joined at web 14c and having end edges 14d, 14e and an interior surface 14f.

The tubular member T includes a pipe 16 having an exterior surface 16a and an interior surface 16b.

The mounting apparatus M includes a clamping member 20 having open ends 22 formed therewith. A mounting portion 24 is formed with the mounting apparatus M opposing the open ends 22 for engaging the external member E for releasably holding the external member E securely to the tubular member T.

Preferably the mounting member M is formed of a resilient material which is capable of exerting significant force when resiliently deformed. Spring steel, for example, accomplishes this result such that the mounting member M may be deformed, and thereafter resiliently returned to its original shape after such deformation forces are removed.

The clamping member 20 of the mounting member M is formed with the mounting portion 24 oppoiste the open ends 22. Preferably, the clamping member 20 as connected with the mounting portion 24 extends for more than 180° but less than 360° about the pipe 16. This allows the interior surface 20a of the clamping member 20 to resiliently, frictionally engage the external surface 16a of the pipe 16 for proper mounting of the clamping member 20 with the tubular member T. In order to facilitate resilient section of the clamping member 20, the clamping member 20 preferably has clamping portions or legs 20b, 20c, positioned opposite each other and spaced apart a distance less than the diameter of the tubular member T such that when the clamping member 20 is mounted with the tubular member T, portions 20b, 20c of the clamping member 20 are spread outwardly apart, thus resiliently engaging the external surface 16a of pipe 16.

Open ends 22 are formed adjacent the portions 20b, 20c of the clamping member 20. The open ends 22 include curved end projections 26 which faciliate mounting the clamping member 20 on the tubular member T and release of the clamping member 20 from the tubular member T. The curved end projections 26 are preferably curved outwardly, substantially transverse to the longitudinal axis of the tubular member T with the end projections 26 extending beyond the outside diameter of the exterior surface 16a of the pipe 16. Preferably, the curved end projections are in a circular configuration but may be of any other suitable shape.

The mounting member M further includes a mounting portion 24 disposed between portions or legs 20b, 20c of the clamping member 20. The mounting portion 24 confines the external member E between the mounting portion 24 and the tubular member T for holding the external member E securely to the tubular member T. Preferably, the mounting portion 24 of the mounting member M has a width which is not substantially greater then the width of the external member E for resiliently engaging the external member E in similar fashion to the clamping member 20 engaging the tubular member T. The mounting portion 24 preferably conforms substantially to the configuration of the external member E, which may be of any configuration. As shown in FIG. 2, the mounting portion 24 engages the channel 14 adjacent mounting portion ends 24a, 24c of the mounting portion 24. Thus, mounting portion 24 resiliently engages the channel 14 with mounting portion ends 24a, 24c respectively, engaging the channel 14 adjacent end point 14d, and end point 14c, respectively, for securing the external member E with the tubular member T. Preferably, the distance between the mounting portion ends 24a, 24c is no less than the distance between any two points on the mounting portion 24 forming a line parallel to a line adjoining mounting portion ends 24a, 24c, respectively. Further, the mounting portion 24 may engage the external member E with portion 24b adjacent web 14c of the channel 14.

In the use or operation of the form of the invention illustrated in FIGS. 1 and 2, the mounting member M is adapted to secure the external member E to the tubular member T. When forcing the mounting member M over the external member E and onto the tubular member T, the outwardly curved end projections 26 promote separation of portions 20b, 20c of the clamping member 20, facilitating ease of inserting the mounting member M thereon. Upon exertion of a force in the direction of arrow 28, end projections 26 expand outwardly in a direction substantially transverse to that of the force in the direction of arrow 28 until the end projections 26 extend over and past the maximum diameter of the exterior surface 16a of the pipe 16. Resilient action of the portions 20a, 20b forces the curved end projections 26 to conform along the shape of the exterior surface 16a of the pipe 16 until the interior surface 20a of the clamping member 20 fully engages the exterior surface 16a of the pipe 16; thus, resiliently and frictionally seating and engaging the pipe 16. When seated as hereinabove described, the mountain portion 24 resiliently engages the channel 14 at portions 24a, 24b, 24c. The resilient frictional engagement of the clamping member 20 with the tubular member T locates and secures the external member E to the tubular member T. Dependent upon the length of the external member E and the tubular member T, multiple mounting members M may be used to properly secure the external member E with the tubular member T.

When it is desired to remove the mounting member M from the assembled external member E-tubular member T, one need only force the outwardly curved depending end projections 26 outwardly, spreading the same part, and pulling on the mounting member M in a direction opposite to that denoted by the arrow 28, thus removing the same. Due to the resilient characteristics of the mounting member M, removal does not destroy the mounting member M's effectiveness and/or reusability. Thus, for example, if a tubular electric heater and/or tracing element were housed within the external member E, and it became necessary to remove and/or inspect and/or repair the same, mounting members M could easily be removed, the external member E removed and the necessary servicing performed. Thereafer the external member could be repositioned with the same mounting members M being used to mount the external member E with the tubular member T.

Thus, the mounting member M of the present invention is a fast, and efficient apparatus for mounting releaseably on external member E with a tubular member T, allowing ease of installation and removal without specialized tools and furthermore being reusable for multiple applications.

The foregoing disclosure and description of the invention are illustrative and explanatory thereof, and various changes in the size, shape, and materials as well as in the details of the illustrated construction may be made without departing from the spirit of the invention.

We claim:

1. A mounting apparatus for releasably securing an external member to a tubular member comprising;
    an elongate tubular member;
    an elongate external member adapted to be releasably secured to and in engagement with said tubular member;
    a clamping member having:
        a resilient arcuate mounting portion adapted to engage said elongate external member having spaced apart, symmetrically formed mounting portion ends, the distance between said mounting portion ends being no less than the distance between any two points on said mounting portion forming a line parallel to a line joining said mounting portion ends; and,
    two resilient, symmetrically formed curved clamping legs joining said mounting portion at said mounting portion ends wherein said mounting portion ends merge into and form an intergral part with said clamping legs;
    said curved clamping legs positioned opposite each other and spaced apart a distance less than the diameter of said elongate tubular member prior to mounting said curved clamping legs for resiliently engaging said elongate tubular member;
    said clamping legs terminating at spaced apart, symmetrically formed, clamping leg ends having symmetrically formed, curved end projections on said clamping leg ends of said clamping legs to facilitate mounting on said elongate tubular member and release therefrom;
    the distance between said mounting portion ends being less than the maximum distance between said curved clamping legs; and,
    said mounting portion releasably securing said elongate external member to said elongate tubular member along the length of said external member and said tubular member with said elongate external member in longitudinal engagement with said elongate tubular member.

2. The mounting apparatus of claim 1, wherein:
    said mounting portion has an interior surface which engages the external member in proximity to said mounting portion ends but with a gap between the external member and said interior surface of said mounting portion above said mounting portion ends.

3. The mounting apparatus of claim 1, wherein:
    said elongate external member is of a channel configuration having end edges that engage said elongate tubular member along the length of said elongate external member.

4. A method for releasably securing an elongate external member to an elongate tubular member comprising the steps of:
    aligning end edges of the elongate external member on the exterior surface and along the length of the tubular member;
    placing a removable clamping member over the elongate external member, the removable clamping member having:
        a resilient arcuate mounting portion adapted to engage the elongate external member having spaced apart, symmetrically formed mounting portion ends, the distance between the mounting portion ends being no less than the distance between any two points on the mounting portion forming a line parallel to a line joining the mounting portion ends;
        two resilient, symmetrically formed curved clamping legs joining the mounting portion at the mounting portion ends wherein the mounting portion ends merge into and form an integral part with the clamping legs; and,
        the clamping legs terminating at spaced apart, symmetrically formed, clamping leg ends having symmetrically formed, curved end projections on the clamping leg ends of the clamping legs to facilitate mounting on the elongate tubular member and release therefrom, the elongate external member being positioned between curved end projections of the clamping member;

pushing the clamping member adjacent the mounting portion thereof toward the elongate tubular member for spreading the curved end projections of the clamping member in conformity with the exterior surface of the tubular member; and snapping the clamping member into position such that the mounting portion of the clamping member engages the external member adjacent the end surface thereof and the legs of the clamping member substantially engage the exterior surface of the tubular member.

5. The method of claim 4, further including the step of:

releasably mounting the elongate external member with the elongate tubular member with a plurality of removable clamping members.

6. The method of claim 4, further including the step of:

removing the clamping member by forcing the curved end projections of the clamping member towards the elongate external member to expand the legs and end projections of the clamping member for facilitating the removal thereof from the tubular member.

* * * * *